A. P. McKAY.
REVERSIBLE DISK PLOW.
APPLICATION FILED SEPT. 26, 1913.
1,137,770.
Patented May 4, 1915.
2 SHEETS—SHEET 2.
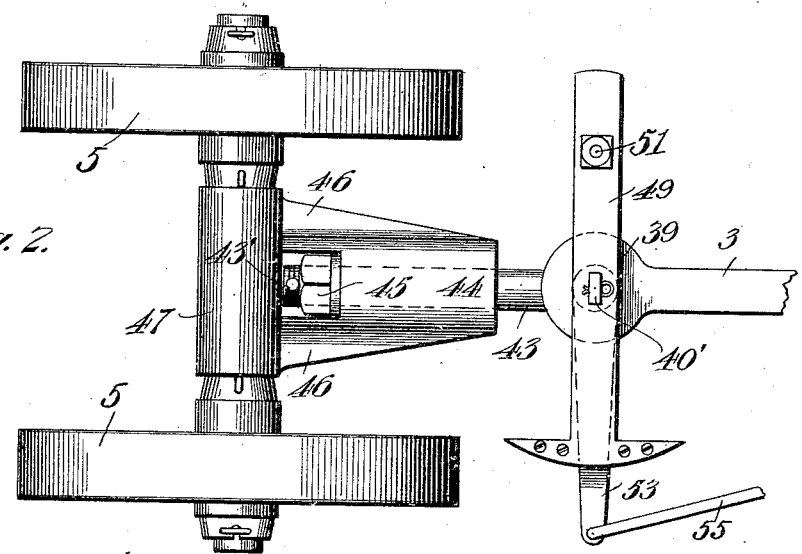
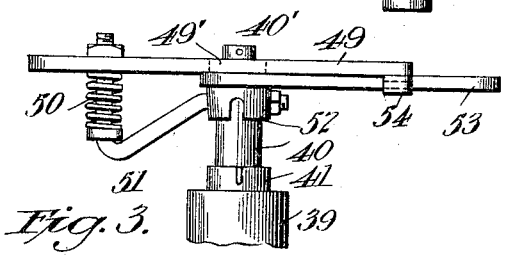
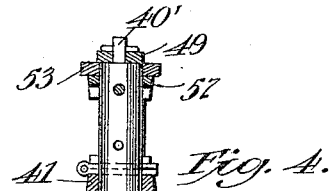
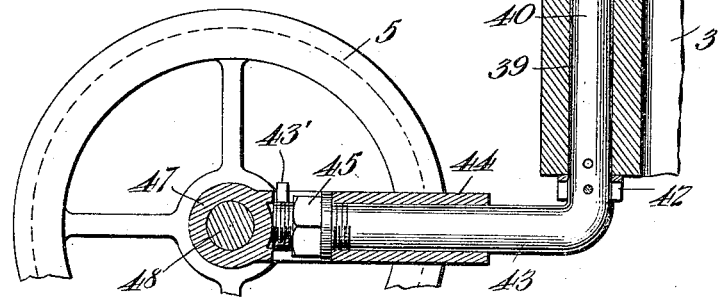
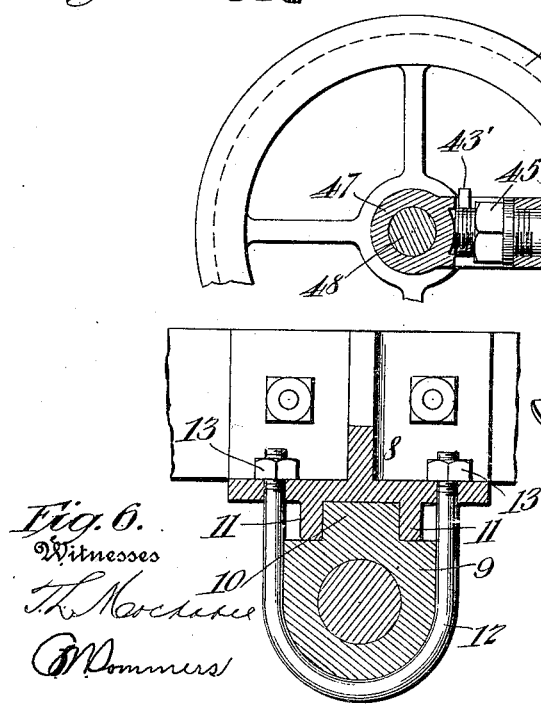

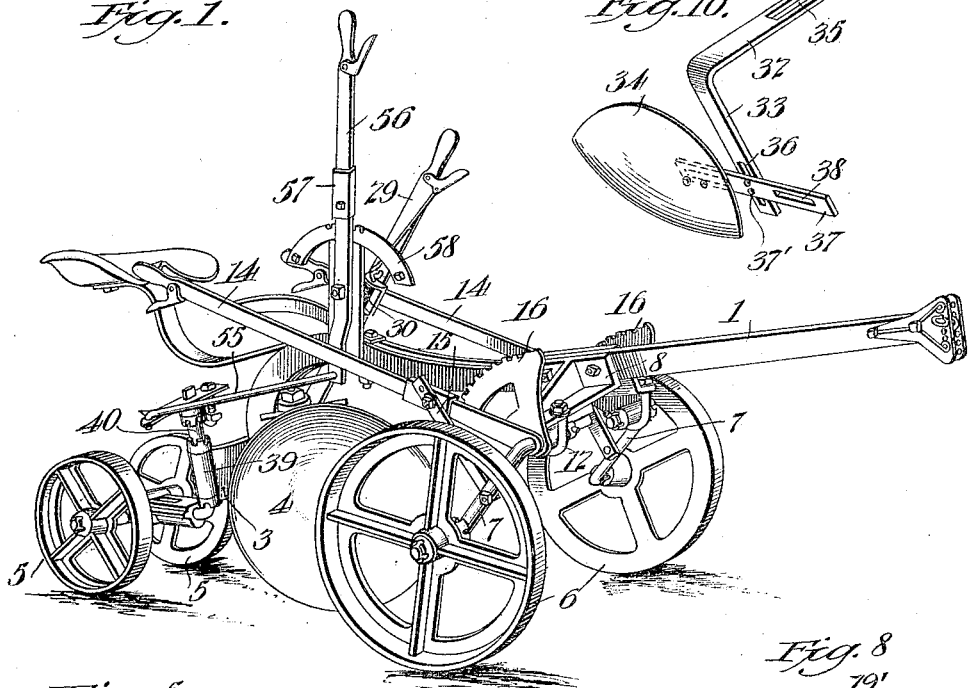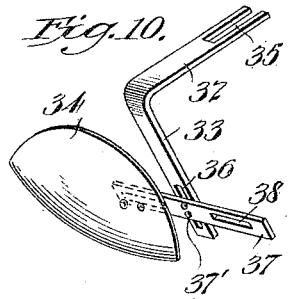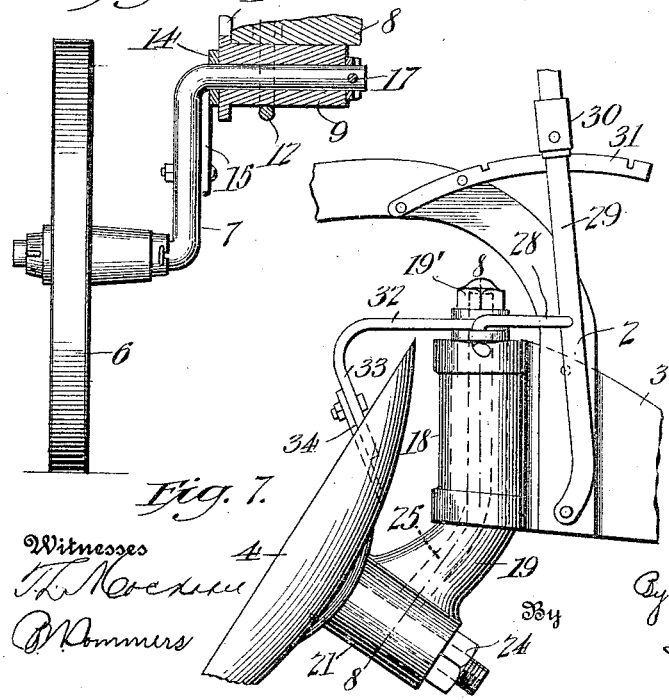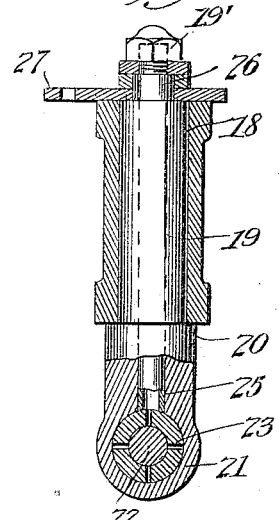

UNITED STATES PATENT OFFICE.

AUGUSTA P. McKAY, OF ROME, GEORGIA.

REVERSIBLE-DISK PLOW.

1,137,770.           Specification of Letters Patent.       Patented May 4, 1915.

Application filed September 26, 1913. Serial No. 791,985.

*To all whom it may concern:*

Be it known that I, AUGUSTA P. McKAY, a citizen of the United States of America, residing at Rome, county of Floyd, and State of Georgia, United States of America, have invented certain new and useful Improvements in Reversible-Disk Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in reversible disk plows in which the position of the disk may be changed for converting the plow from a right hand to a left hand plow or vice versa, and the objects of my invention are to provide means for raising and lowering the front land and furrow wheels according to the position of the disk and to independently adjust said wheels toward and from the draft beam; means for lubricating the bearing of the plow disk; means for locking and releasing the rear thrust and provide means for effecting a plurality of adjustments of the scrapers for the plow-disk.

In the accompanying drawings—Figure 1 is a perspective view of a plow embodying my invention. Fig. 2 is a top plan view of the rear wheels and the locking and releasing mechanism therefor. Fig. 3 is a rear elevation of the upper part of Fig. 2. Fig. 4 is a vertical longitudinal section through the rear wheel mounting. Fig. 5 is a detail longitudinal section through the front wheel mounting. Fig. 6 is an enlarged transverse section of the same. Fig. 7 is a side elevation of the plow disk and adjusting mechanism from the side opposite to that shown in Fig. 1. Fig. 8 is a section on line 8—8 of Fig. 7. Fig. 9 is a detail perspective view of the rear-wheel latch. Fig. 10 is a detail perspective view of the scrapers and adjustable supporting brackets.

Referring to the drawings, 1, indicates the plow beam preferably constructed of two flat plates and formed at its rear end with a vertical portion 2, (Fig. 7), which constitutes a standard for a bracket 3, which extends in front of and to the rear of the standard and serves as a connection to the beam for both the reversible plow disk 4 and the rear thrust wheels 5.

The beam 1 is supported at or near its center by the land and furrow wheels 6, the axles 7, of which are made in the form of crank arms whereby the wheels may be raised and lowered independently for the well known purpose of permitting both wheels to serve as either a land or a furrow wheel when the position of the plow disk is changed to form either a right hand or a left hand plow. In addition to the means for raising and lowering the wheels, which will be hereinafter described, I provide in conjunction therewith means for independently adjusting the wheels toward and from the plow beam.

The adjusting means consist of two brackets 8 which are fixed to the sides of and project laterally from the beam 1. On the underside of each bracket is mounted an axle-box 9, which is formed with a longitudinal rib 10, Fig. 6, slidably mounted in a guide way formed on the underside of the bracket by means of parallel flanges 11. These axle-boxes are secured to the brackets and clamped in their adjusted positions by yokes or U-shaped bolts 12 which take under the boxes and are secured to the tops of the brackets by nuts 13.

The raising and lowering means for the wheels consist of controlling levers 14 fulcrumed on the horizontal portion of the axles and connected in fixed relation with the wheels by means of tie-rods 15, which connect the levers with the vertical portions of the axles. The levers are provided as usual, with spring and hand operated bolts which engage segmental racks 16 fixed to or formed integral with the axle-boxes 9. While the axles are rotatable in the boxes 9 they are held against longitudinal movement with relation to the boxes and racks by means of cotter pins 17 in the inner ends of the axles (Fig. 5). It will readily be seen that while the racks may be moved with the axle boxes and wheels, to and from the beam they are held against rotation, so that by means of the bolts and operating levers the wheels may be independently adjusted to any desired height and distance from the beam.

The front end of the bracket 3 (Fig. 7) has a vertical socket 18, which forms a bearing for the pivot post 19 of the plow disk 4. This post has a shoulder 20 abutting against the lower edge of the socket 18 and the lower end of the post is formed with an inclined socket 21 which forms a bearing for the spindle 22 of the plow disk 4, said spindle being surrounded by a bushing 23 and held in the socket by a nut 24. The post 19 has an internal bore 25, which extends from the top of the post to the bushing 22 for the purpose of supplying a lubricant to the latter. This bore is preferably formed by casting the post 19 around a suitably formed iron pipe which will project above the post. The post extends above the socket and has a square portion 26 for the reception of a crank-arm 27 by means of which the post is rotated to change the position of the plow-disk.

The free end of the crank-arm is connected by a link 28 to an operating lever 29 pivoted at its lower end on the standard 2 of the plow beam, and said lever is locked as usual by a spring and hand actuated bolt 30, which engages an arc 31 fixed on the beam 1. Above the arm 27 on the square portion 26 of the post 19 is also mounted a bracket consisting of a horizontal arm 32 and a depending arm 33, which latter is bent inward toward the plow disk and carries two scraper blades 34. The horizontal arm 32 of the bracket has a forked end 35 which engages said square portion of the post 19 and permits a longitudinal adjustment of said arm 32. The depending arm 33 has a longitudinal slot 36 in which a cross arm 37 is connected by means of bolts 37'. Each end of the cross arm 37 has a longitudinal slot 38 in which a scraper blade 34 is connected. It will be seen that the scrapers may be adjusted, both as to width and height with relation to the plow disk and to and from the latter. The crank-arm 27 and the arm 32 of the scrapers are clamped to the post 19 by means of a cap-nut 19' which screws onto the lubricating pipe, which, as stated above is cast in the post and extends above the squared portion 26. Said nut also serves as a closure for the pipe.

The rear end of bracket 3 (Fig. 4) has a socket 39, in which is journaled a vertical post 40 which constitutes the swivel for permitting the rear wheels 5 to swing to the right and left when the plow is being turned. The post has suitable collars 41 and 42 above and below the socket respectively, by means of which the beam 1 may, if desired, be raised and lowered. The post 40 has a horizontal arm 43, on which is rockably mounted a bearing sleeve 44 held thereon by a nut 45, which forms a thrust bearing. The sleeve is provided with lateral webs 46 which project beyond the nut 45 and carry a transverse bearing socket 47 in which the axle 48 of the rear wheels 5 is journaled. A pin 43' projects upwardly from the end of the arm 43 to engage the webs 46 and limit the rotation of the bearing 44. A two-armed locking-lever 49 is so mounted on top of the post 40 that it may be rocked thereon, but cannot turn independently of the post. For this purpose the post has a reduced squared end-portion 40' which takes through an oblong slot 49' in the lever, said slot being slightly longer than said end portion. The lever 49 is normally held against rocking by a spring 50 interposed between the underside of the lever 49 and a supporting bracket 51. The latter projects through the post 40 and secures thereto a collar 52 which serves to pivotally support a latch arm 53 beneath the two-armed lever 49; said latch-arm projecting beyond one end of the lever 49 and between two cam-faced lugs 54, on the under face of the latter. These lugs are preferably detachably secured to the two-armed lever for the purpose hereinafter described.

The free end of arm 53 is connected by a rod 55 (Fig. 1) to an operating lever 56 which, as usual, has a spring and hand operated bolt coöperating with a notched segmental rack 58 for holding the lever in different positions.

The construction and operation of the front wheels, and the swinging of the plow disk will be readily understood from the foregoing detailed description of the parts.

The latch for locking and controlling the rear wheels is operated in the following manner: When the plow is running straight the rear wheels are held in rigid alinement with the line of draft by the arm 53 which is locked to the lever 49 between the lugs 54, the arm 53 being locked by the operating lever 56. In turning the plow the rear wheels may be turned by the lever 56 or the lever 49 may be released to permit the rear wheels to swing freely, by depressing the left end of lever 49 against the action of the spring 50, thereby raising the lugs 54 out of engagement with arm 53 releasing the lever 49. When the plow has been turned the lever 49 and arm 53 come into alinement and are locked together automatically by the lugs 54.

When it is desirable to have the plow serve as a permanent right hand plow and no reversing of the disk at the ends of furrows is required, the disk being placed in right hand position, the rear detachable lug may be removed as the front lug will perform the function of resisting the left hand lateral pull of the disk. When the plow reaches the end of the furrow in this case, the absence of the rear lug allows the plow to turn to the left without the necessity of releasing the latch.

I claim—

1. A reversible disk plow, comprising a pair of rear thrust wheels movable about a substantially vertical pivot and free to rock about a substantially horizontal pivot and lever mechanism to turn said wheels about said vertical pivot.

2. A reversible disk plow, comprising a pair of rear thrust wheels revoluble about a substantially vertical pivot and free to rock about a horizontal pivot, means to limit the rocking movement of said wheels about the horizontal pivot and means to lock the wheels against movement about the vertical pivot.

3. A reversible disk plow, comprising a beam, a horizontally movable support pivotally connected with the beam, a rocking member connected with said support, thrust wheels journaled in the rocking member, means on the support to lock the same against movement relative thereto, and means for swinging the locking means and support in unison.

4. A reversible disk plow, comprising a beam, a horizontally movable support pivotally connected with the beam, a rocking member connected with said support, thrust wheels journaled in the rocking member, means to lock the support against movement, and means to limit the swing of the rocking member.

5. A reversible disk plow, comprising a beam, a rotatable post connected with the beam and having a horizontal portion, a sleeve rockable on said horizontal portion, rear thrust wheels carried by said sleeve, a lever connected with said post, a latch bar, and means to automatically lock the lever to the latch.

6. A reversible disk plow, comprising a beam having a rear standard, a post journaled at the rear of the standard and having a rearwardly projecting arm, a sleeve rockable on said arm, thrust wheels carried by said sleeve, means to limit the swing of the sleeve, and means to automatically lock the post against rotation.

7. A reversible disk plow, comprising a beam, a post journaled in a bracket carried by the beam and having a rearward projecting arm, a sleeve rockably mounted on said arm having a transverse socket, an axle mounted in said socket, thrust wheels on the axle, a pin on the arm adapted to engage lateral webs on the sleeve to limit the rocking movement of the latter, and means to automatically lock the post against rotation.

8. A reversible disk plow, comprising a beam, a post journaled in a bracket connected with the beam and having a rearward projecting arm, a sleeve rockable on said arm, thrust wheels connected with said sleeve, a two-armed lever fixed on the post, locking lugs on one arm of the lever, and a latch bar adapted to be engaged by said lugs to lock the post against rotation.

9. A reversible disk plow, comprising a beam, a post journaled in a bracket connected with the beam and having a rearward projecting arm, a sleeve rockable on said arm, thrust wheels connected with said sleeve, a two-armed lever fixed on the post, a latch-bar pivoted on the post and projecting beyond one end of the lever, locking lugs on the lever adapted to engage the latch bar, and means to lock the latter with relation to the beam.

10. A reversible disk plow, comprising a beam, a post journaled in a bracket carried by the beam and having a rearward projecting arm, a sleeve rockable on said arm, thrust wheels connected with said sleeve, a two-armed lever movable with and rockable on the post, a latch-bar pivoted on the post beneath the lever and projecting beyond one end of the latter, means to yieldingly hold the lever and latch in engagement, cam-faced lugs on the lever adapted to lock the latch and lever together, and means to swing the latch and to lock the same against movement.

In testimony that I claim the foregoing as my invention, I have signed my name in presence of two subscribing witnesses.

AUGUSTA P. McKAY.

Witnesses:
J. B. SULLIVAN,
ERNEST STEELE.

Copies of this patent may be obtained for five cents each, by addressing the "Commissioner of Patents, Washington, D. C."